Patented Jan. 6, 1948

2,434,147

UNITED STATES PATENT OFFICE 2,434,147

OPTICAL GLASS

Paul F. De Paolis, Rochester, N. Y., assignor to Eastman Kodak Company, Rochester, N. Y., a corporation of New Jersey No Drawing. Application August 4, 1945, Serial No. 609,023

3 Claims. (Cl. 106—47)

This invention relates to glass having optical values in a range useful in the design of optical instruments. Specifically, this application relates to such glass having an index of refraction for the D line ($n_D$) of the order of 1.75 and an Abbe value ($\nu$) of the order of 44. In general, these glasses are of the non-silicate type covered generically by Reissue Patent No. 21,175, Morey, over which they are specific improvements.

While the Morey patent disclosed the wide field within which useful glasses might be found, this field is not of uniform productiveness. The various oxides cannot be combined in all proportions to obtain equally useful glasses; nor are they all compatible in all proportions to make a glass without tendency to crystallize or devitrify. This application relates to a particular area of that field that has been found to have definite utility in the designing of lenses and optical instruments.

The glasses herein described are characterized, in addition to the optical values mentioned, by the presence in substantial amounts, over ten per cent of each, of lanthanum, tungsten, and thorium oxides, totalling substantially sixty per cent of the whole batch.

I have found that the ingredients, when present in the range of proportions specified in the claims, will with ordinary glass-making technique yield a glass having high transparency, hardness, stability, and weather resistance and capable of taking a high polish and of withstanding the ordinary glass-treating processes involved in the manufacture of optical parts.

The value of $n_D$ and $\nu$ will vary somewhat with the variations in proportions and ingredients within the scope of the claims.

Examples of this invention follow, the oxides of the elements named being used in the given proportions by weight. In the first examples zinc oxide may be partly or wholly replaced by tin oxide. It is to be understood that, as is usual in glass making, the original ingredients may not be introduced in the form of oxides, but they are reduced to oxides in the furnace. The tables also give certain optical values.

In the examples given, although the parts are precisely given and these are preferred, it is to be understood that variations in these proportions and addition of other oxides in small quantities are contemplated, provided these changes are within the ranges and the resulting proportions are of the order of those given in the claims. Such changes will naturally result in variations in the optical properties. All such modifications and equivalents I consider as within the scope of my invention.

When in the claims I use the expression "oxide selected from the group," I do not mean necessarily a single oxide, but mean one or more oxides.

Having thus described my invention, what I claim is:

1. Optical glass consisting of the following oxides in the proportions by weight as given: lanthanum, 25 to 33 parts; tungsten, 15 to 20 parts; thorium, 10 to 15 parts; boron, 25 to 30 parts; and oxide selected from the group consisting of the oxides of calcium, zinc, and tin, 10 to 15 parts.

2. Optical glasses consisting of the following oxides in substantially the proportions by weight as given: lanthanum, 28 parts; tungsten, 18 parts; thorium, 13 parts; calcium, 13 parts; boron, 28 parts.

3. Optical glasses consisting of the following oxides in substantially the proportions given: lanthanum, 30 parts; tungsten, 18 parts; thorium, 12 parts; zinc and tin totalling 12 parts; boron, 28 parts.

PAUL F. DE PAOLIS.

REFERENCES CITED

The following references are of record in the file of this patent:

UNITED STATES PATENTS

| Number | Name | Date |
| --- | --- | --- |
| 2,241,249 | Eberlin et al. | May 6, 1941 |

*Examples*

| | 1 | 2 |
| --- | --- | --- |
| Lanthanum oxide | 30.0 | 28.0 |
| Tungsten oxide | 18.0 | 18.0 |
| Thorium oxide | 12.0 | 13.0 |
| Calcium oxide | | 13.0 |
| Zinc oxide | 12.0 | |
| Boric oxide | 28.0 | 28.0 |
| $n_D$ | 1.76 | 1.75 |
| $\nu$ | 44.0 | 44.0 |

Certificate of Correction

Patent No. 2,434,147.

January 6, 1948.

PAUL F. DE PAOLIS

It is hereby certified that error appears in the printed specification of the above numbered patent requiring correction as follows: Column 1, line 56, in the table, first column thereof, for "nS" read $n_D$; and that the said Letters Patent should be read with this correction therein that the same may conform to the record of the case in the Patent Office.

Signed and sealed this 23rd day of March, A. D. 1948.

[SEAL]

THOMAS F. MURPHY,
*Assistant Commissioner of Patents.*